(12) United States Patent
Cagliari et al.

(10) Patent No.: US 11,786,004 B2
(45) Date of Patent: Oct. 17, 2023

(54) SPORTS SHOE AND METHOD OF CONSTRUCTION THEREOF

(71) Applicant: CALZATURIFICIO DAL BELLO S.R.L., Casella d'Asolo (IT)

(72) Inventors: Pietro Cagliari, Montebelluna (IT); Stefano Prosdocimo, Valdobbiadene (IT); Alessandro Morandin, Caerano di San Marco (IT); Federico Soligo, Castelfranco Veneto (IT); Loris Tittoto, Asolo (IT)

(73) Assignee: CALZATURIFICIO DAL BELLO S.R.L., Casella d'Asolo (IT)

(*) Notice: Subject to any disclaimer, the term of this patent is extended or adjusted under 35 U.S.C. 154(b) by 788 days.

(21) Appl. No.: 16/593,699

(22) Filed: Oct. 4, 2019

(65) Prior Publication Data
US 2020/0107606 A1 Apr. 9, 2020

(30) Foreign Application Priority Data

Oct. 4, 2018 (IT) .................. 102018000009176

(51) Int. Cl.
*A43B 5/04* (2006.01)
*B29D 35/00* (2010.01)
*B29K 77/00* (2006.01)
*B29K 307/04* (2006.01)

(52) U.S. Cl.
CPC ........ *A43B 5/0482* (2013.01); *B29D 35/0009* (2013.01); *B29K 2077/00* (2013.01); *B29K 2307/04* (2013.01)

(58) Field of Classification Search
CPC .................. A43B 5/0482; B29D 35/009; B29K 2307/04; B29K 2077/00
See application file for complete search history.

(56) References Cited

U.S. PATENT DOCUMENTS

| 5,160,061 | A | * | 11/1992 | Stolzman | ............ | B29C 66/5344 |
|---|---|---|---|---|---|---|
| | | | | | | 229/5.5 |
| 5,215,207 | A | * | 6/1993 | Stolzman | ............ | B29C 66/3024 |
| | | | | | | 229/5.5 |

(Continued)

FOREIGN PATENT DOCUMENTS

| EP | 2 620 067 A1 | 7/2013 |
|---|---|---|
| WO | 2015/167645 A1 | 11/2015 |

OTHER PUBLICATIONS

May 24, 2019 Search Report and Written Opinion issued in Italian Patent Application No. 201800009176.

*Primary Examiner* — Katharine G Kane
(74) *Attorney, Agent, or Firm* — Oliff PLC

(57) ABSTRACT

A sports shoe includes a shell formed of a first shell portion and of a second shell portion, distinct from each other and adapted to be assembled together. The first shell portion includes a first peripheral rim edge and the second shell portion includes a second peripheral rim edge including, respectively, a first joining rim portion and a second joining rim portion adapted to be coupled together. Specifically, the first joining rim portion includes at least a joining channel adapted to cooperate with a corresponding at least a joining projection included in the second joining rim portion. The joining channel and the corresponding joining projection are fixable to each other by means of heat welding.

12 Claims, 9 Drawing Sheets

(56) References Cited

U.S. PATENT DOCUMENTS

| | | | | |
|---|---|---|---|---|
| 5,401,342 A | * | 3/1995 | Vincent | A61M 39/22 |
| | | | | 264/445 |
| 5,426,872 A | * | 6/1995 | Hayes | A43B 5/04 |
| | | | | 36/117.1 |
| 8,453,352 B2 | | 6/2013 | Dodge | |
| 2002/0146530 A1 | * | 10/2002 | Bristow | F16B 12/125 |
| | | | | 428/61 |
| 2003/0217486 A1 | * | 11/2003 | Cagliari | A43B 9/02 |
| | | | | 36/118.2 |
| 2004/0079634 A1 | * | 4/2004 | Wickersham, Jr. | B21K 25/00 |
| | | | | 228/136 |
| 2004/0148807 A1 | * | 8/2004 | Grandin | A43B 5/049 |
| | | | | 36/117.1 |
| 2006/0021258 A1 | | 2/2006 | Beck | |
| 2006/0064904 A1 | * | 3/2006 | Confortin | A43B 5/04 |
| | | | | 36/117.1 |
| 2008/0000109 A1 | * | 1/2008 | Challande | A43B 5/04 |
| | | | | 36/117.1 |
| 2010/0180471 A1 | | 7/2010 | Dodge | |
| 2012/0144703 A1 | * | 6/2012 | Trinkaus | B29D 35/081 |
| | | | | 36/34 A |
| 2014/0158297 A1 | * | 6/2014 | Pronko | A63B 60/08 |
| | | | | 156/308.2 |
| 2017/0280819 A1 | * | 10/2017 | Corbeil | B32B 29/08 |

\* cited by examiner

SPORTS SHOE AND METHOD OF CONSTRUCTION THEREOF

TECHNICAL FIELD OF THE INVENTION

The present invention refers to a sports shoe used preferably for the practice of winter disciplines, such as, for example, a ski boot and the like. Specifically, the present invention refers to a sports shoe provided with a partially closed structure, such as a shell, suitable to accommodate a user's foot. Finally, the present invention refers to a method for making the sports shoe comprising the shell.

STATE OF THE PRIOR ART

Different sports, such as alpine skiing, snowboarding, mountaineering, cross-country skiing, telemark, ice skating, and the like, require sports shoes specifically designed to support and protect a user's foot in use.

The sports shoe is, for example, a boot that supports the foot and, to varying degrees, the ankle and/or lower leg in such a way as to connect them to a sports apparatus, such as a ski. Specifically, the boot supports the foot, ankle and lower leg in such a way that the movement thereof is defined within a given spatial range and there is a suitable resistance to ensure a mutual transmission of forces from the user's foot to the ski through the boot. In this condition, adequate maneuverability of the sports equipment according to the discipline for which the boot was designed is ensured.

Specifically, all the boots suitable for the different sports mentioned above have common requirements; however, there are differences between them regarding the degree of support and functional details, thus requiring a specific design. For example, in sports wherein the boot must provide a high degree of support, it must be made with materials having high rigidity, i.e., with a high elastic modulus. Instead, in sports where the boot must provide a low degree of support, it must be made with materials with low rigidity, i.e. with a low elastic modulus.

Therefore, in order to make boot shells suitable for different sports, it is necessary to use materials with different characteristics, such as, for example, rigidity. However, in order to process, i.e. transform, materials having different rigidities, it is necessary to use different forming techniques. In other words, the choice of the material with which to form the shell is limited by the forming technique, and vice versa.

For example, a shell made of material having low rigidity is typically formed as a single piece by means of injection molding techniques, wherein the movable and fixed parts of the mold are preferably closed with a movement along a vertical direction. The technique of molding the shell as a single piece provides for the forming thereof around a punch, placed between movable portions of the forming mold, which is properly shaped to have a form substantially corresponding to that of the foot to be contained. Once formed, the shell is removed from the punch by means of bending made possible by its low rigidity. In other words, the shell is deformed in a reversible way, i.e., it is deformed elastically by bending and, at the same time, it is removed from the punch around which it was formed.

This forming technique, however, has some drawbacks. For example, the choice of the material is limited to a group characterized by low rigidity so as to avoid a breakage of the shell when the shell is deformed to remove it from the punch. Therefore, in this state, it is not possible to make a shell with a material having a high rigidity. This drawback is particularly evident when, for example, the shell is formed with a recycled material which, as is well known, has degraded mechanical properties relative to the same material which has not undergone any processing, and thus it may not be sufficiently elastically deformable.

Optionally, it is possible to use materials with high rigidity when the shell has a shape that provides for a relatively wide opening which allows it to be removed from the punch without inducing deformation. Thus, in this state, the shape of the shell is limited at the design stage because a relatively large opening must be provided.

Moreover, when a material with low rigidity is used, when the thickness of the walls of the shell is high, the rigidity of the shell is high and thus hinders the removal thereof from the punch. Therefore, in this state, the choice of the shape of the shell, i.e. the choice of the thickness or plurality of thicknesses thereof, is limited in the design stage, it being necessary to guarantee a low stiffness to allow it to be removed from the punch.

Moreover, as is well known in the state of the art, during the forming step of the shell, it is possible to overmold the shell onto films or functional elements, properly positioned in the mold, which give the shell further functionality.

The films, for example, are generally made of composite material suitable to modify the properties of the material of which the shell is formed, such as mechanical strength or abrasion resistance. Alternatively, the functional elements are devices, positioned at the heel and/or toe, which serve as removable elements for coupling the boot to sports equipment, such as, for example, ski bindings.

However, the choice of characteristics, such as mechanical ones, and of the extension of the films, or of the functional elements, is limited by the need to keep the structure of the shell flexible, i.e., elastically deformable, to allow the removal thereof from the punch. This problem is particularly evident when, for example, the boot is formed from a recycled material and films are used to improve its aesthetic or mechanical characteristics, such as films with a high elastic modulus and which are suitable for increasing the mechanical characteristics of the shell.

In the state of the art, the patent document U.S. Pat. No. 8,453,352B2 describes a ski boot shell having a construction comprising two distinct portions of the shell which are formed substantially symmetrical with respect to a longitudinal plane of the assembled shell. The two portions of the shell are then fixed together by means of corresponding flanges protruding from the peripheral edge thereof. The mutual fixing of the flanges of each part of the shell is carried out by means of fixing devices, such as rivets, or by gluing or welding.

This construction allows, in the known art, for the two portions of the shell to be formed separately using any material having any desired rigidity because each portion of the shell, once formed, does not need to be bent, i.e., does not need to be deformed elastically, to be removed from the forming mold.

However, this construction has some drawbacks. For example, it is necessary to provide flanges that protrude from the peripheral edge of the two portions of the shell and that generally extend therefrom in a perpendicular direction. In this state, the overall dimensions of the shell and, consequently, of the boot, are increased.

In addition, at the design stage, each portion of the shell must have protruding flanges, thus restricting the design possibilities of the shape of the shell.

Moreover, the possible use of glues to fix the flanges of the two portions of the shell does not guarantee the durability of the attachment, and finally the glues require specific procedures of use and disposal, from the point of view of compliance with regulations relating to the safety of operators and the environment, thus increasing the costs of construction of the shell.

Consequently, there is a need to make a shell of a sports shoe, such as a ski boot, and provide a method of construction thereof so as to overcome the drawbacks described above.

SUMMARY OF THE INVENTION

The task of the present invention is to create a sports shoe comprising a shell, such as a shell for a ski boot, formed with a material the characteristics of which, such as rigidity, may be chosen in various ways without restricting them in the design stage, providing, moreover, for a versatile process for making the sports shoe equipped with the shell.

In the scope of the task described above, an object of this invention concerns the creation of a shell for a sports shoe comprising at least two shell portions that may be formed separately, using known techniques, and that may then be fixed to each other. In this way the shape of the shell portions is not limited by the choice of the material with which they are formed, i.e. the shape is not limited by the characteristics of the material, such as, for example, rigidity. In other words, an object of the present invention concerns the construction of a shell comprising shell portions that may be formed with a wide range of types of materials each having a wide range of characteristics. In this state it is possible to use recycled materials.

A further object concerns making a shell for a sports shoe the shape of which, i.e., the thickness or plurality of thicknesses of which, is not limited by the need to meet the stringent technical requirements for forming the shell.

A further object concerns making a shell for a sports shoe the shape of which, i.e., the degree of coverage of the foot, ankle and lower leg, is not limited by the need to satisfy the stringent technical requirements for forming the shell.

A further object concerns making a shell for a sports shoe that provides for films or functional elements, suitably formed or fixed, having characteristics, such as, for example, mechanical ones, and extension that are not limited by the need to satisfy stringent technical requirements for forming the shell.

A further object concerns making a shell for a sports shoe wherein the shell portions are fixable to each other in a durable and structurally stable way so as to guarantee, in use, an adequate mechanical strength of the shell.

A further object concerns making a shell for a sports shoe wherein the shell portions are fixable to each other in such a way that does not provide for joining portions that protrude from the shell, thus increasing the aesthetic characteristics thereof.

A further object concerns making a shell for a sports shoe wherein the shell portions are fixable by means of joining portions the arrangement of which does not limit the design possibilities of the shape of the shell.

A further object concerns constructing a shell for a sports shoe wherein the shell portions are not fixed to each other by means of glue.

The aforementioned task and objects, and others that will be more apparent in the following description, are achieved by means of a sports shoe comprising a shell as defined in claim 1 and a method for making the same as defined in claim 10.

BRIEF DESCRIPTION OF THE FIGURES

Further characteristics and advantages of the sports shoe comprising a shell of the present invention, and of the method for making the same, will become more evident in the following description relative to embodiments provided purely by way of non-limiting example, with reference to the following figures, wherein.

DETAILED DESCRIPTION OF THE INVENTION

In the following description, terms such as "above", "below", "upper", "lower", "left", "right", "front", "rear" or similar refer to a sports shoe comprising a shell, according to the present invention, in the normal arrangement of use.

Figure 1A:
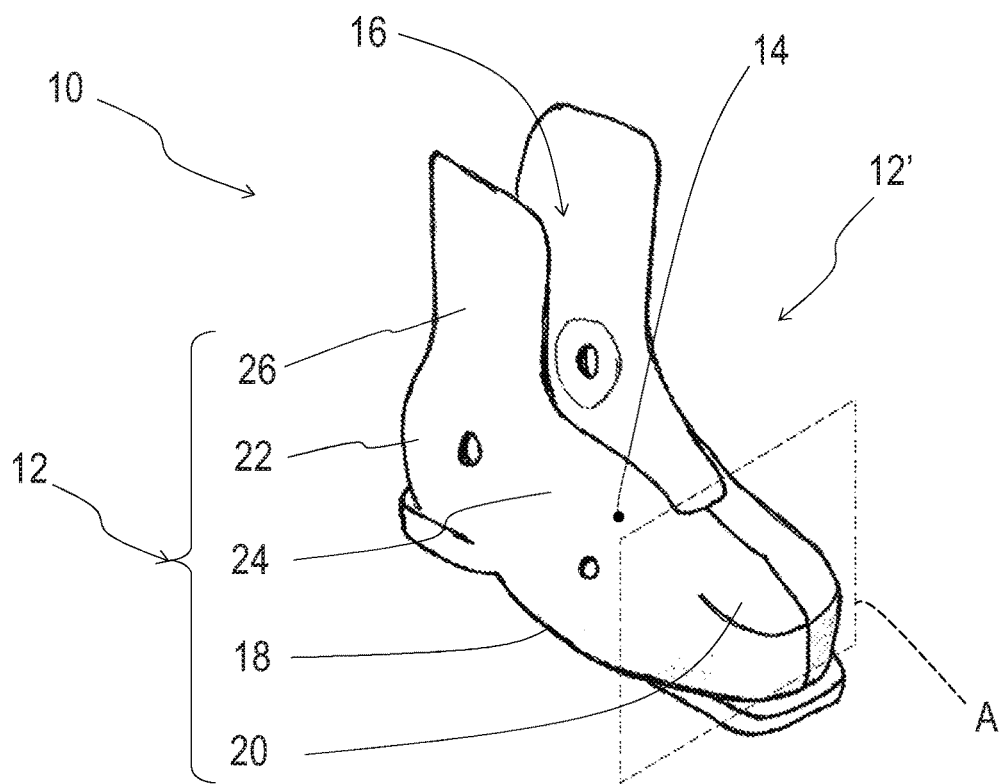
FIG. 1A is a perspective view of a shell for a ski boot in the assembled state, in a first embodiment of the present invention.
Figure 1B:
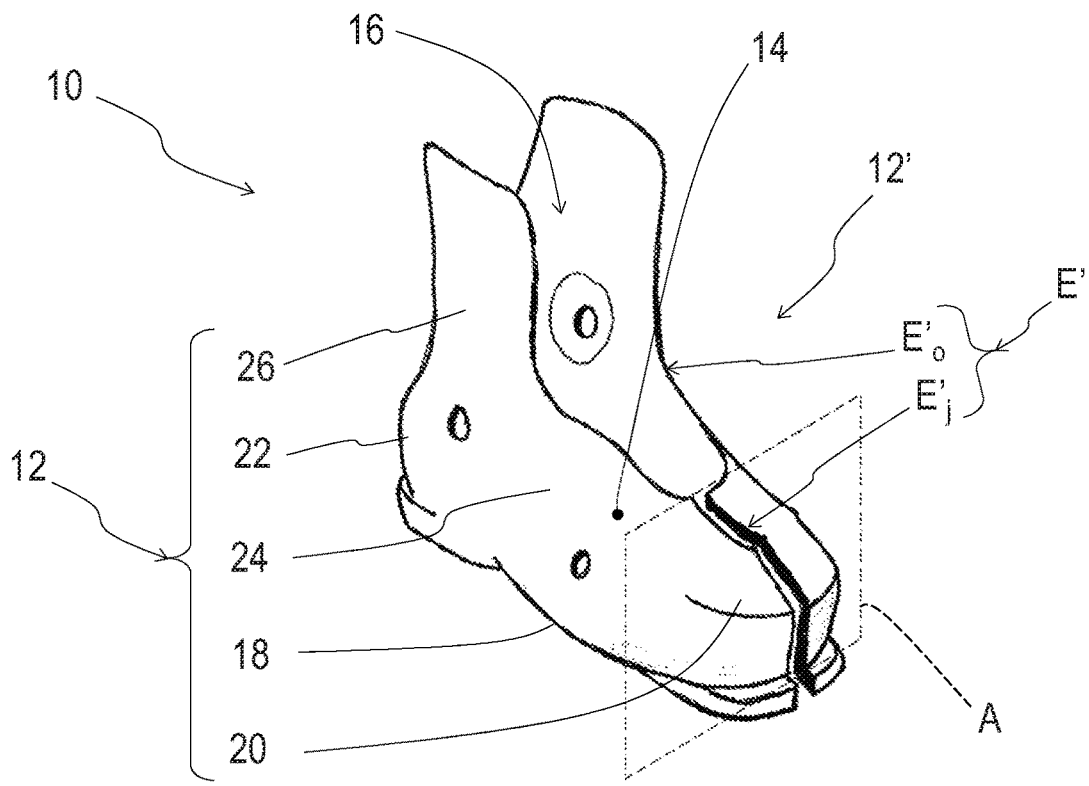
FIG. 1B is a first perspective view of the shell of FIG. 1A in the unassembled state.
Figure 1C:
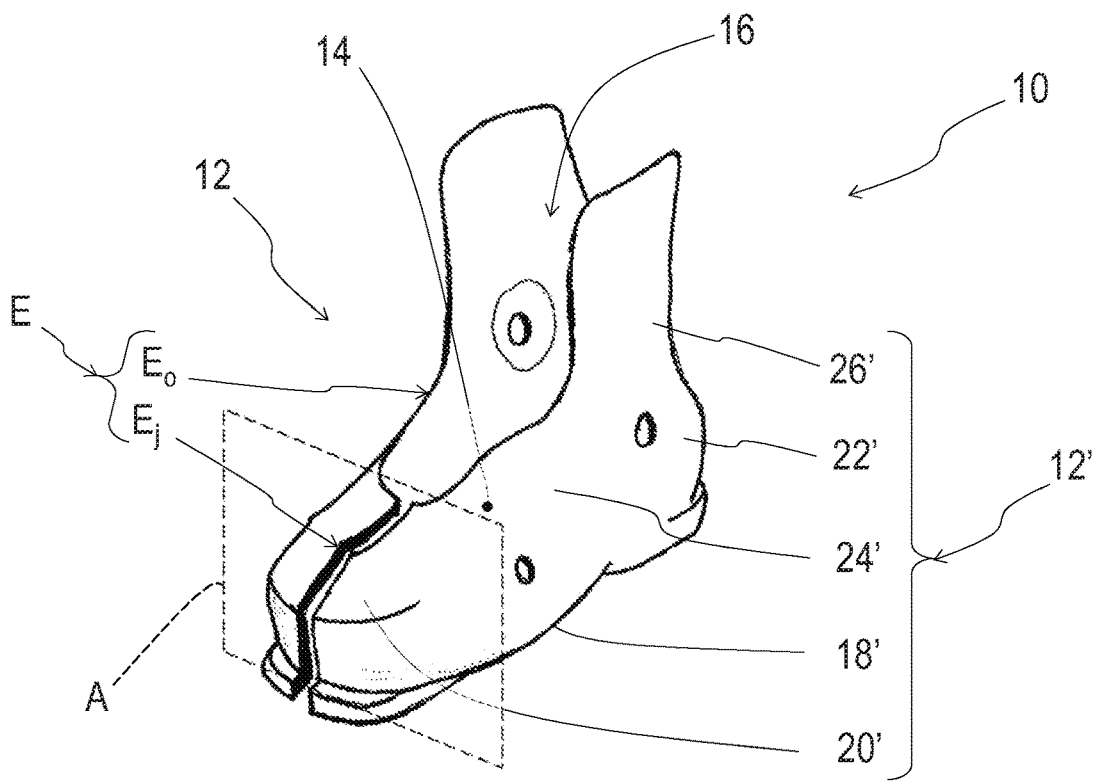
FIG. 1C is a second perspective view of the shell of FIG. 1A in the unassembled state.

In reference to FIGS. 1A, 1B and 1C, a shell 10 of a sports shoe, such as preferably a ski boot, shaped to accommodate in use a foot of a user, is represented.

In this embodiment the shell 10 comprises a first shell portion 12 and a second shell portion 12', formed separately. Specifically, when assembled together, the first shell portion 12 and the second shell portion 12' define a region of containment 14 of the foot which is accessed through an opening region 16 adapted for the insertion of the foot.

Specifically, in FIG. 1A the first shell portion 12 and the second shell portion 12' are represented joined together, i.e., in the assembled state, as explained in detail hereinafter. Instead, in FIGS. 1B and 1C, the first shell portion 12 and the second shell portion 12' are represented separate from each other, i.e., in the unassembled state.

In reference again to FIGS. 1B and 1C, both the first shell portion 12 and the second shell portion 12' respectively comprise a lower first sole portion 18 and second sole portion 18', adapted in use to accommodate the sole of the foot, an front first toe portion 20 and second toe portion 20', adapted to accommodate the toes, and a rear first heel portion 22 and second heel portion 22', adapted to accommodate the heel of the foot.

Specifically, referring to FIG. 1B, the first toe portion 20 and the first heel portion 22 of the first shell portion 12 are connected together through the first sole portion 18 and a first side portion 24. Finally, from the first heel portion 22 of the first shell portion 12 extends, in a substantially vertical direction, a first ankle portion 26 adapted in use to accommodate the ankle and the lower part of the user's leg.

Similarly, referring to FIG. 1C, the second toe portion 20' and the second heel portion 22' of the second shell portion 12' are connected together through the second sole portion 18' and a second side portion 24'. Finally, from the second heel portion 22' of the second shell portion 12' extends, in a substantially vertical direction, a second ankle portion 26' adapted in use to accommodate the ankle and the lower part of the user's leg.

Finally, in reference again to FIGS. 1B and 1C, the first shell portion 12 and the second shell portion 12' each have a respective peripheral rim edge, respectively a first peripheral rim edge E and a second peripheral rim edge E'. The first peripheral rim edge E and the second peripheral rim edge E' are surfaces that connect the surface facing the containment region 14 with the outer surface of the shell 10 respectively corresponding to the first shell portion 12 and the second shell portion 12'.

When the shell 10 is in the assembled state, the first peripheral rim edge E and the second peripheral rim edge E' are adapted to be coupled together and each one comprises an opening edge portion, respectively a first opening edge portion $E_o$ and a second opening edge portion $E'_o$, and a joining rim portion, respectively a first joining rim portion $E_j$ and a second joining rim portion $E'_j$.

In other words, when the first shell portion 12 and the second shell portion 12' are assembled together to form the shell 10, the first opening edge portion $E_o$ is coupled with the second opening edge portion $E'_o$, and the first joining rim portion $E_j$ is coupled with the second joining rim portion $E'_j$.

Specifically, the first opening edge portion $E_o$ and the second opening edge portion $E'_o$ define, when coupled, the opening region 16 of the shell 10. Instead, the first joining rim portion $E_j$ and the second joining rim portion $E'_j$ extend continuously so as to connect the ends of the corresponding opening edge portion through the toe portion, the sole portion and the heel portion, respectively, of the first shell portion 12 and the second shell portion 12'.

The distance between the surface facing the containment region 14 and the outer surface of the shell 10 of the first shell portion 12 and of the second shell portion 12' defines a thickness thereof. Note that, optionally, it is possible to provide a first shell portion 12 and a second shell portion 12', each consisting of a number of portions with different thicknesses.

Figure 2A:
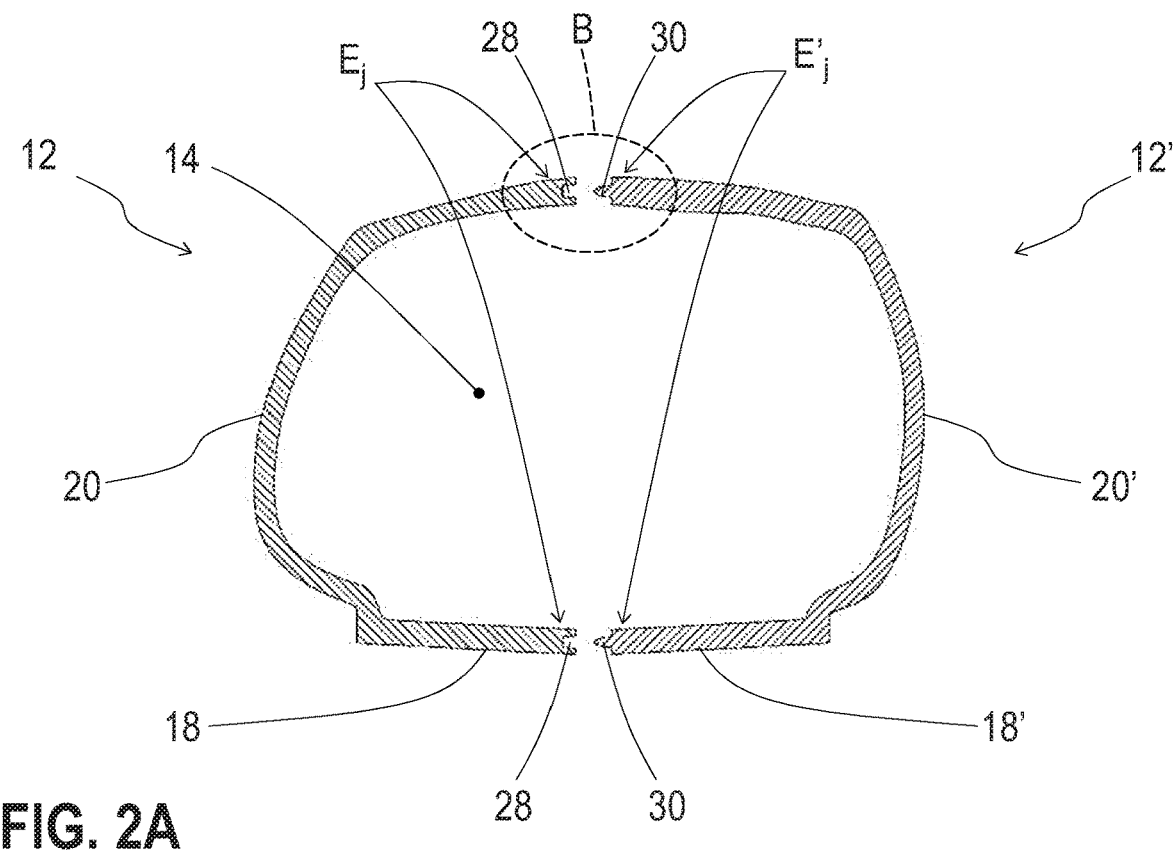
FIG. 2A is a sectional view of the shell taken on a plane A of FIGS. 1B and 1C.

Referring to FIG. 2A, a sectional view of the shell 10 taken on a plane A is shown, represented in FIGS. 1B and 1C, which is perpendicular to the longitudinal plane of the shell 10, and which is positioned at the first toe portion 20 and the second toe portion 20', respectively, of the first shell portion 12 and the second shell portion 12'.

Specifically, the first shell portion 12 provides for at least a joining channel 28 with a substantially "U" shaped section (open to the right in the figure), which, preferably, extends continuously along the entire extension of the first joining rim portion $E_j$ of the first shell portion 12. Instead, the second shell portion 12' provides for at least a joining projection 30 adapted to cooperate with the corresponding joining channel 28 of the first joining rim portion $E_j$, as explained below, and which, preferably, extends continuously along the entire extension of the second joining rim portion $E'_j$ of the second shell portion 12'.

Figure 2B:
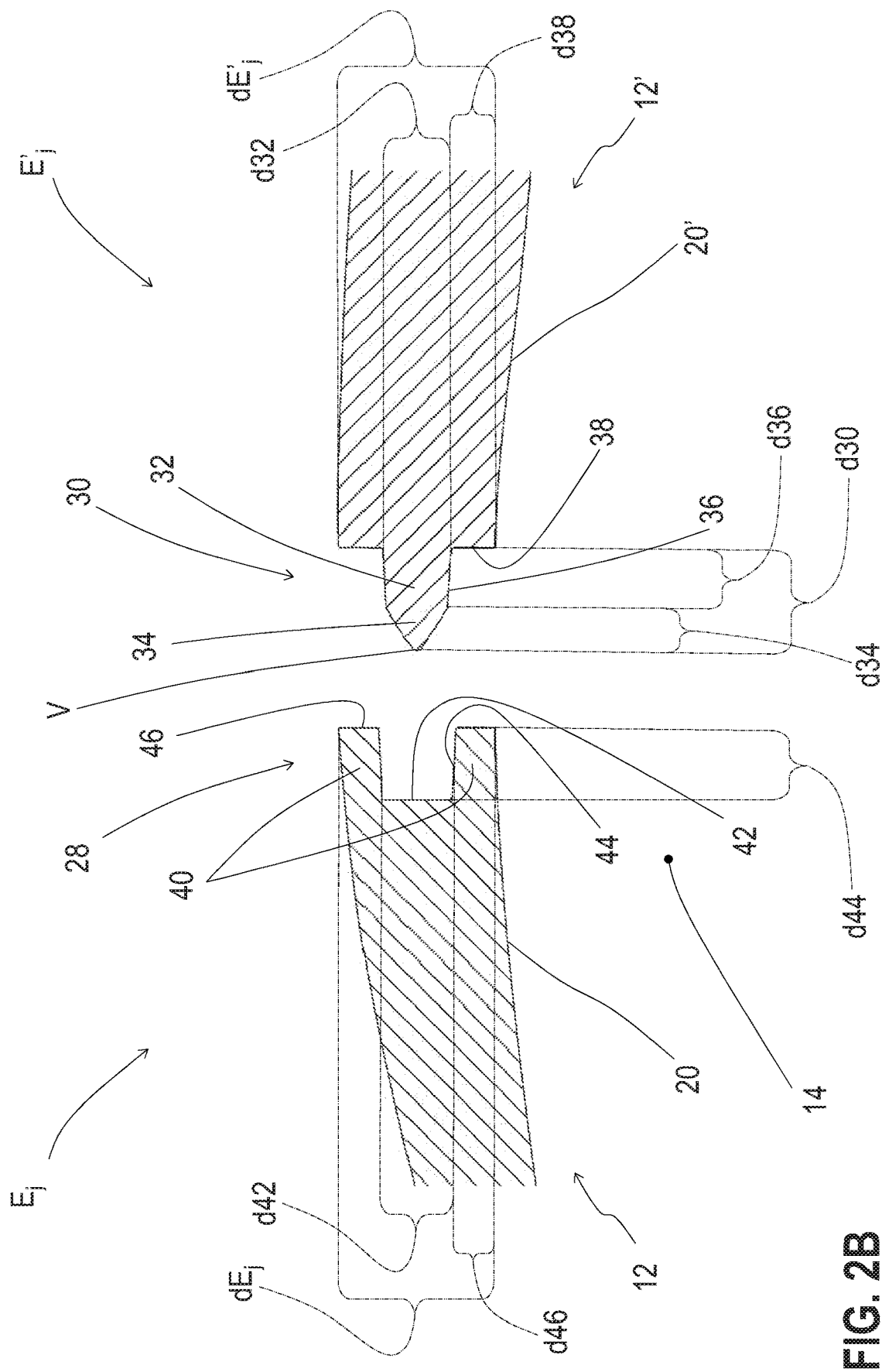
FIG. 2B is an enlarged view of a region indicated at the letter B in FIG. 2A.

Referring to FIG. 2B, which represents an enlarged view of a region indicated at the letter B in FIG. 2A, the first joining rim portion $E_j$ and the second joining rim portion $E'_j$ each have a thickness, respectively a first thickness $dE_j$ and a second thickness $dE'_j$. The first thickness $dE_j$ and the second thickness $dE_j$ define the distance between the surface facing the containment region 14 and the outer surface of the shell 10 of the first shell portion 12 and the second shell portion 12', respectively at the first joining rim portion $E_j$ and the second joining rim portion $E'_j$. Preferably, the first thickness $dE_j$ and the second thickness $dE_j$ are the same.

Moreover, still referring to FIG. 2B, the joining projection 30 comprises a body 32 and, preferably, a concentration head 34, such as an energy director in a heat welding process, as will be explained hereinafter. The body 32 has a section substantially complementary to the section of the joining channel 28 and is formed at the center of the thickness of the second joining rim portion $E'_j$ connecting thereto through a first base surface thereof. Instead, the concentration head 34 has a substantially triangular section and is formed on a second base surface of the body 32, which is opposite to the second joining rim portion $E'_j$. Specifically, a vertex V of the concentration head 34, which is opposite to the second base surface of the body 32, is spaced from the first base surface of the body 32 at a distance d30 which is greater than a depth, i.e., a height, d44 of the joining channel 28.

With this construction, the second joining rim portion $E'_j$ has a shape that provides substantially for three types of surfaces adapted to form a joint by means of heat welding, as explained below, such as the free surfaces of the concentration head 34, two side surfaces 36 of the body 32 and two abutment surfaces 38 of the second joining rim portion $E'_j$.

Instead, still referring to FIG. 2B, the joining channel 28 is formed at the center of the thickness of the first joining rim portion $E_j$ and is defined by two side walls 40, with a substantially rectangular section and a bottom surface 42.

With this construction, the first joining rim portion $E_j$ has a shape that substantially consists of three types of surfaces adapted to form a joint by means of heat welding, including the bottom surface 42, two side surfaces 44 of the joining channel 28, and two abutment surfaces 46 corresponding to the free base of the side walls 40 that faces the second joining rim portion $E'_j$.

In this state, as will be described hereinafter, the first joining rim portion $E_j$ is adapted to cooperate with the second joining rim portion $E'_j$ to form a joint between the first shell portion 12 and the second shell portion 12' of the shell 10. The joint is made by mutual heat welding of the surfaces of the joining channel 28 with the surfaces of the joining projection 30 and of the second joining rim portion $E'_j$. In other words, the bottom surface 42 of the joining channel 28 is adapted to cooperate with the concentration head 34 of the junction projection 30, the side surfaces 44 of the joining channel 28 are adapted to cooperate with the side surfaces 36 of the body 32 of the joining projection 30, and the abutment surfaces 46 of the joining channel 28 are adapted to cooperate with the abutment surfaces 38 of the second joining edge $E'_j$.

Now, still referring to FIG. 2B, dimensional relationships are indicated which refer to the extension of the surfaces of the joining channel 28 and the joining projection 30 in a preferred embodiment. Specifically, the size of a surface, intersecting the plane A, extending along a direction substantially parallel to the direction of the thickness of the first shell portion 12 and the second shell portion 12' will be defined as "width", while the size of a surface, intersecting the plane A, extending along a direction substantially perpendicular to the direction of the thickness will be defined as "height".

Specifically, a base of the concentration head 34, opposite to the vertex V, has a width preferably corresponding to a width d32 of the second base surface of the body 32 of the joining projection 30, whereon it is formed.

Moreover, preferably, the bottom surface 42 has a width d42 equal to the width d32 of the second base surface of the body 32, or possibly greater having a difference provided by a gap. The side surfaces 44 of the joining channel 28 have a height d44 equal to, or less than, a height d36 of the side surfaces 36 of the body 32 of the joining projection 30, and the abutment surfaces 46 of the joining channel 28 have a width d46 equal to a width d38 of the abutment surfaces 38, or possibly less, having a difference provided by a gap. One should note that the distance of the vertex V from the first base surface of the body 32, i.e., the height d30 of the joining projection 30, is given by the sum of the height d36 of the side surfaces 36 with a height d34 of the concentration head 34, which is the distance of the vertex V from the second base surface of the body 32.

Below are expressions that define intervals for the size relationships of the surfaces of the joining channel 28 and the joining projection 30 in a preferred embodiment, wherein the first thickness $dE_j$ is equal to the second thickness $dE'_j$:

$$dE_j = dE'_j = d42 + 2 \times d46 = d32 + 2 \times d38,$$

$$d42 = dE_j \times 0.38 \div dE_j \times 0.58,$$

$$d32 = dE_j \times 0.34 \div dE_j \times 0.58,$$

$$d38 = dE_j \times 0.21 \div dE_j \times 0.33,$$

$$d46 = dE_j \times 0.21 \div dE_j \times 0.31,$$

$$d44 = dE_j \times 0.38 \div dE_j \times 0.64,$$

$$d36 = dE_j \times 0.38 \div dE_j \times 0.64,$$

$$d30 = d34 + d36 = dE_j \times 0.57 \div dE_j \times 0.96.$$

In a more preferred embodiment, wherein the first thickness $dE_j$ is equal to the second thickness $dE'_j$, the dimensional relationships of the surfaces of the joining channel 28 and of the joining projection 30 are:

$$dE_j = dE'_j = d42 + 2 \times d46 = d32 + 2 \times d38,$$

$$d42 = dE_j \times 0.487,$$

$$d32 = dE_j \times 0.436,$$

$$d38 = dE_j \times 0.282,$$

$$d46 = dE_j \times 0.257,$$

$$d44 = d36 = dE_j \times 0.505,$$

$$d30 = d34 + d36 = dE_j \times 0.733.$$

Preferably, 2 mm $\leq dE_j = dE'_j \leq 5$ mm, and in a more preferred embodiment, $dE_j = dE'_j = 3.9$ mm.

Moreover, the inner angle between the sides forming the vertex V of the concentration head 34 is preferably between 45 and 120 degrees, and in a more preferred embodiment the angle is 60 degrees. Instead, the curvature radius of the vertex V is preferably between 0.072 mm and 0.23 mm, and in a more preferred embodiment the curvature radius is 0.15 mm.

Thus, with this construction, the shell 10 comprises the first shell portion 12 and the second shell portion 12', which are initially formed separately and which, subsequently, are joined together through, respectively, the first joining rim portion $E_j$ and the second joining rim portion $E'_j$. In this state, advantageously, the first shell portion 12 and the second shell portion 12' may be formed with a material having any characteristic, thus having any rigidity desired, and may be formed with any shape, or with any extension or thickness, since it is not necessary to deform them elastically to remove them from a mold during a forming process, such as, for example, injection molding.

After being formed, the first shell portion 12 and the second shell portion 12' are then joined together by coupling the first joining rim portion $E_j$ with the second joining rim portion $E'_j$ through, respectively, the joining channel 28 and the joining projection 30, which are adapted to cooperate with each other in order to form a joint made by means of a heat welding process, as explained hereinafter.

Advantageously, the shapes of the joining channel 28 and of the joining projection 30 make it possible to make a joining surface, defined by the respective cooperating surfaces, which has an extension adapted to ensure the mechanical seal of the joint between the first shell portion 12 and the second shell portion 12' by means of heat welding, as described hereinafter. Specifically, the extension of the joint surface is greater than that of the first thickness $dE_j$ and the second thickness $dE'_j$, respectively, of the first shell portion 12 and the second shell portion 12'. This ensures a larger joint surface area is made by means heat welding.

Moreover, advantageously, the shapes of the joining channel 28 and of the joining projection 30 allow, as explained hereinafter, the channel 28 to contain within it the material that is melted during the heat welding process of the first joining rim portion $E_j$ with the second joining rim portion $E'_j$, thus avoiding the formation of visible burrs at the joint.

The joining of distinct parts by heat welding is known in the art. In this description, the term "heat welding" refers to a joining process wherein, by means of heat, the surfaces to be welded are melted, i.e., made fluid, until a temperature is reached adapted to allow mutual welding (hereinafter referred to as "welding temperature").

Various heat welding processes have been developed which differ according to the heat generation mechanism and may be classified as external or internal heating processes. The group of external heating processes comprises those wherein heating is carried out by an external source that generates and transfers heat to the surfaces of the materials to be welded, such as hot gas welding or hot blade welding. Instead, the group of internal heating processes comprises those wherein heat is generated through the conversion of energy by the materials to be welded, such as, for example, ultrasonic welding.

The various heat welding processes comprise common steps such as heating the surfaces to be welded until the welding temperature is reached, applying a pressure, i.e. a closing force, to make the surfaces adhere to each other, and cooling until a temperature is reached that keeps the surfaces joined together.

Thus, in a heat welding process it is essential that the materials of the surfaces to be welded provide for melting, induced by heating, and solidification, induced by cooling. One should note that in this description the term "melting" of a material refers to reaching the welding temperature. For example, for a thermoplastic resin, the term "melting" refers to reaching a welding temperature such as a temperature higher than the melting temperature of a crystalline or semi-crystalline thermoplastic resin, or a temperature which is higher than the glass transition temperature of an amorphous thermoplastic resin, at which it is in a viscous fluid state.

Moreover, it is essential that the materials of the surfaces are weldable to each other to ensure the forming of the heat weld. In other words, the chemical nature and physical/thermal characteristics of the materials (such as the melting temperature, glass transition temperature, etc.) must be compatible to ensure the forming of a weld. For example, in the case of thermoplastic resins, the choice of combinations of resins that are weldable to each other may be made on the basis of information obtainable from industry manuals. Generally, the joining of surfaces formed with the same thermoplastic resin offers excellent forming and mechanical sealing characteristics of the weld. However, it is possible to weld together surfaces formed with thermoplastic resins of a different chemical nature by following the information contained in the industry manuals.

In this preferred embodiment, the materials used are thermoplastic materials and, hereinafter, the term "thermoplastic material" means a material comprising in its composition at least one thermoplastic resin. Thus, the term "thermoplastic material" means materials consisting of a single thermoplastic resin, such as polypropylene (PP), polycarbonate (PC), acrylonitrile-butadiene-styrene (ABS), polyamide 6 (PA6), polyamide 66 (PA66), polyamide 12 (PA12), and the like, or a mixture of two or more thermoplastic resins, such as a mixture of ABS/PC, PA6/PA66, and the like. In addition, the term "thermoplastic material" also means a resin or thermoplastic mixture comprising fillers and/or fibers, such as glass fibers (GF), glass balls (GB), carbon fibers (CF), talcum (T), aramid fibers (AF), Teflon (PFTE), and the like.

Specifically, in the preferred embodiment of the present invention, the first shell portion 12 and the second shell portion 12', i.e, the respective joining channel 28 of the first joining rim portion $E_j$ and the joining projection 30 of the second joining rim portion $E'_j$, are formed of the same thermoplastic material, such as polyamide 12 reinforced with 30% by weight of carbon fiber (PA12 30CF), which is a material having high rigidity (generally with an elastic modulus greater than 10000 MPa); however, this embodiment is not restrictive.

Moreover, in this preferred embodiment, heat welding is performed by the ultrasonic welding process, however this embodiment is not restrictive.

The welding of distinct parts by ultrasonic welding, i.e., by ultrasonic energy, is generally performed by positioning the surfaces of the parts to be welded in a stacked relationship juxtaposed to form a contact region, hereinafter referred to as "interface". A closing force is then exerted between the pieces, i.e., between the surfaces at the interface, and ultrasonic energy is applied to the pieces by means of an ultrasonic energy transmission head, also known as a "sonotrode", which produces a vibration, i.e., a relevant alternating movement, of the surfaces at the interface in a substantially parallel direction thereto. Generally, in this stage ultrasonic energy has a vibration frequency between 20 and 50 kHz.

Thus, the dissipation of the ultrasonic energy generates, through friction, a heating that induces a melting of the materials. The melting is localized in the region at the interface and after a predetermined time interval, usually from a fraction of a second to a few seconds, the ultrasonic energy is stopped to allow the melted materials to solidify, i.e., to cool down, so as to form a joining portion, i.e., a weld portion.

In the following, in reference to FIGS. 3A, 3B, 3C and 3D, a method is described for making the shell 10 of the preferred embodiment described above.

First of all, the first shell portion 12 and the second shell portion 12' of the shell 10 are formed with known techniques such as, for example, injection molding.

Figure 3A:
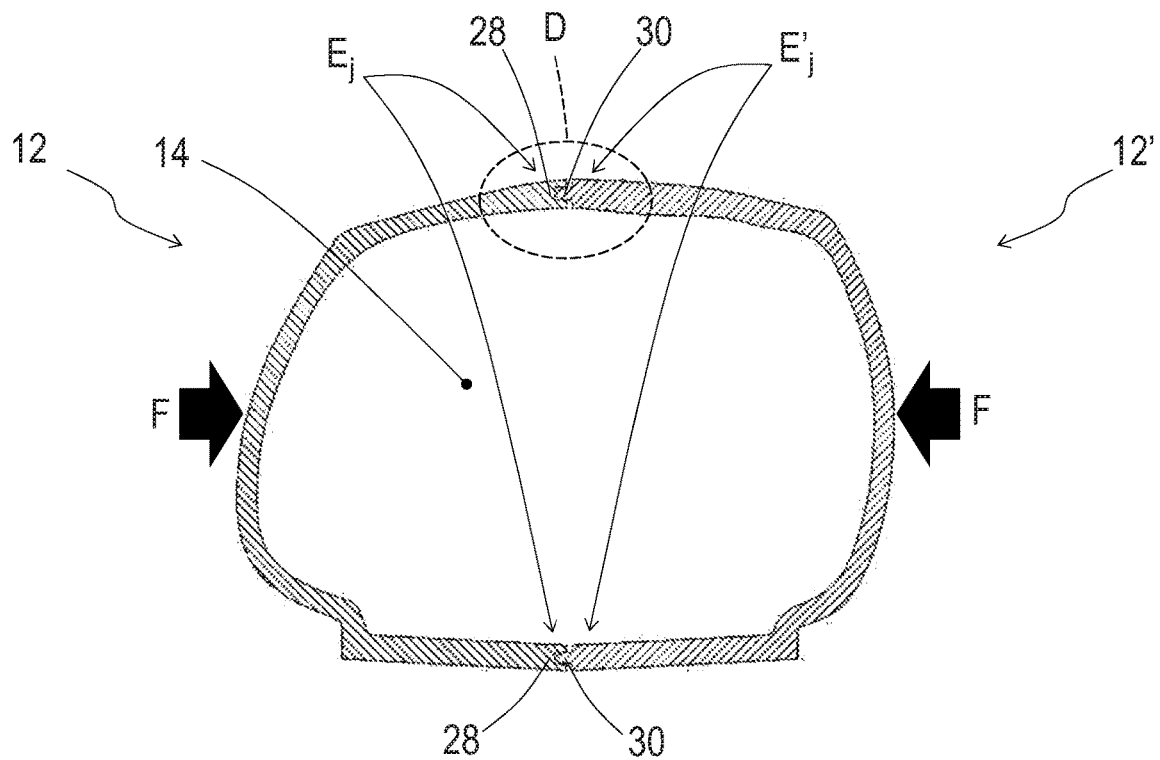
FIG. 3A is a schematic representation of a forming step of the shell of FIGS. 1A, 1B and 1C.
Figure 3B:
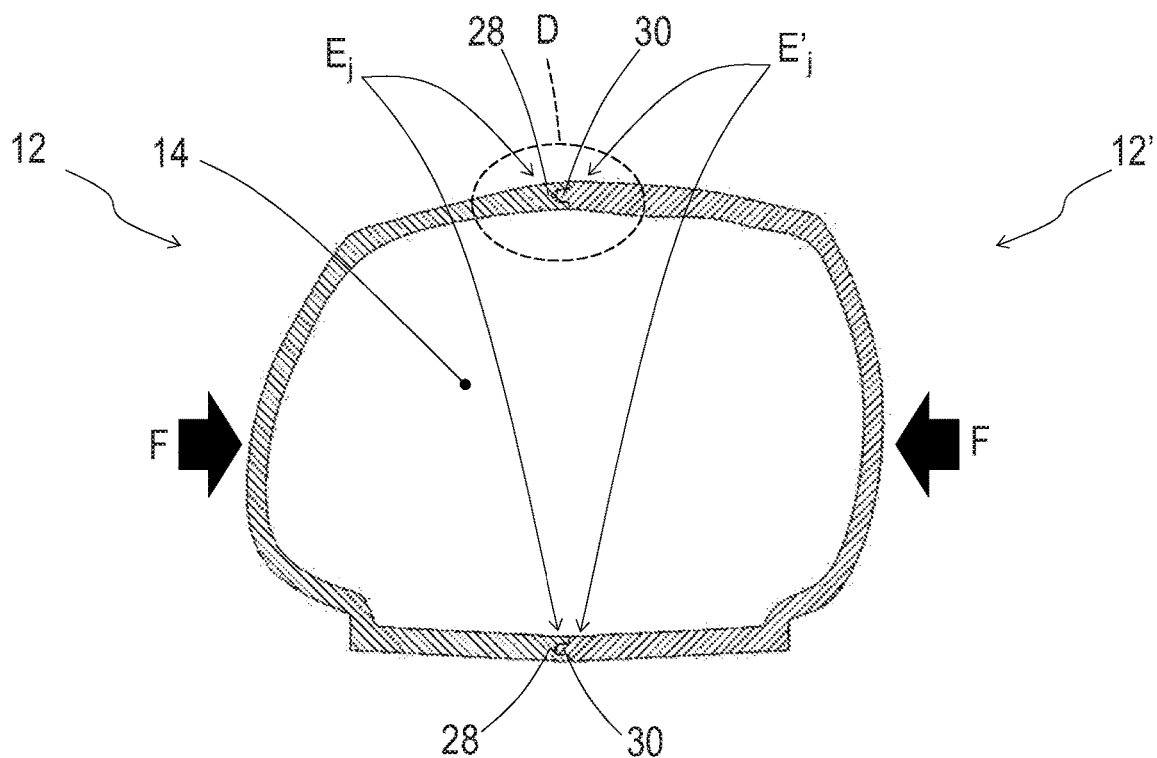
FIG. 3B is a schematic representation of a further forming step of the shell of FIGS. 1A, 1B and 1C.
Figure 3C:
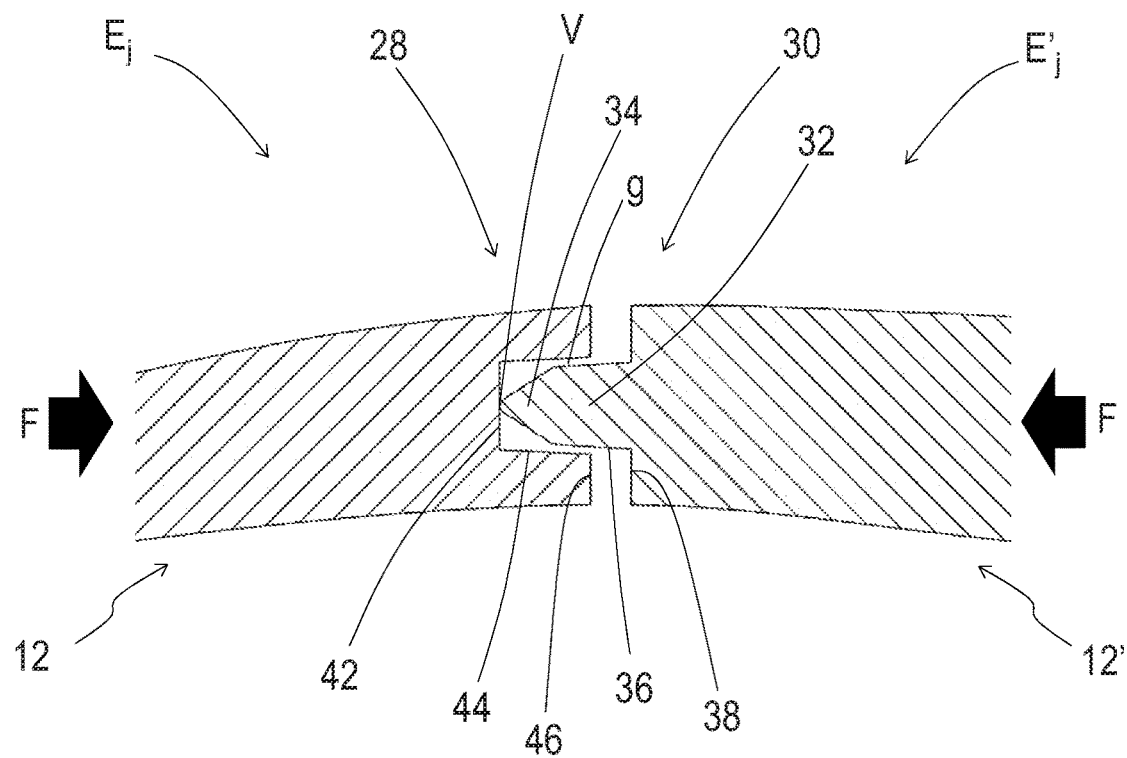
FIG. 3C is an enlarged view of a region indicated at the letter D in FIG. 3A.

Subsequently, referring to FIGS. 3A and 3C, the first shell portion 12 and the second shell portion 12' are arranged inside an ultrasonic welding apparatus (not shown) so that the joining channel 28 of the first joining rim portion $E_j$ is engaged by the respective joining projection 30 of the second joining rim portion $E'_j$, putting them in contact.

In this preferred embodiment, the contact region, i.e., the interface, is defined by the contact between the bottom surface 42 of the joining channel 28 and the vertex V of the concentration head 34 of the joining projection 30. However, it is possible that in a case wherein, for example, the joining projection 30 does not provide for the concentration head 34, the interface is defined by the contact between the bottom surface 42 of the joining channel 28 and the second base of the body 32 of the joining projection 30, by the contact between the side surfaces 44 of the joining channel 28 and the side surfaces 36 of the body 32, and by the contact between the abutment surfaces 46 of the joining channel 28 and the abutment surfaces 38 of the second joining rim portion $E'_j$.

Then, a closing force F is applied, by means of a press system (not shown), on the first shell portion 12 and/or on the second shell portion 12' in order to mutually press each against the other, applying a preferably adjustable pressure, the first part of the joining edge $E_j$ towards the second joining rim portion $E'_j$ at the contact region, i.e., at the interface (in the figures the closing force F is represented with thick arrows).

Figure 3D:
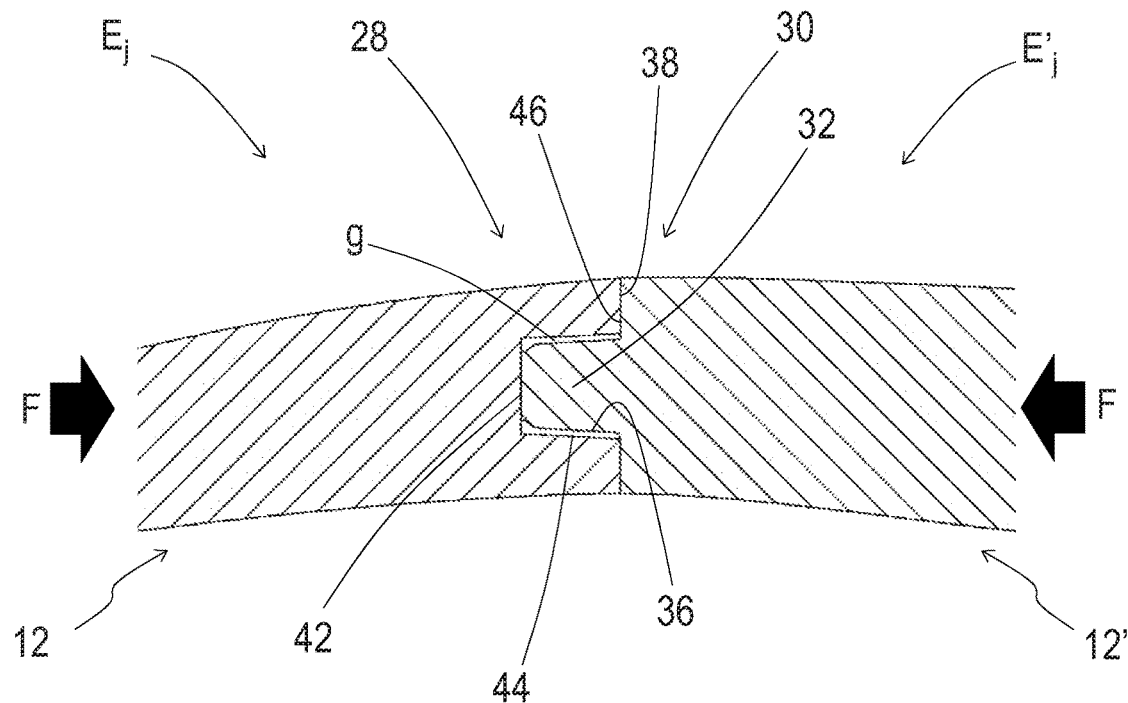
FIG. 3D is an enlarged view of a region indicated at the letter D in FIG. 3B.

Subsequently, referring to FIGS. 3B and 3D, ultrasonic energy is applied, i.e., the generation of vibrations is activated which are transmitted by a sonotrode (not shown), or by a plurality of sonotrodes, on the first shell portion 12 and/or on the second shell portion 12', keeping the closing force F applied. Specifically, the sonotrode, placed in contact with the first shell portion 12 and/or the second shell portion 12', transmits the vibrations at the interface between the first joining rim portion $E_j$ and the second joining rim portion $E'_j$, i.e., at the contact region between the joining channel 28 and the joining projection 30.

In this state, therefore, the thermoplastic material of the bottom surface 42 of the joining channel 28 and of the concentration head 34 of the joining projection 30 reaches, by means of friction, the welding temperature which is localized at the respective contact surface.

Specifically, during the melting of the thermoplastic material, the partially melted concentration head 34 penetrates the also partially melted bottom surface 42 due to the closing force F applied. Moreover, the same applied closing force F allows advantageously to distribute, i.e., to push, the melted portion of the material along the side surfaces 44 of the joining channel 28 and along the side surfaces 36 of the body 32 of the joining projection 30, filling a gap g therebetween.

Finally, by continuing to apply ultrasonic energy, when the concentration head 34 is completely melted, the abutment surfaces 46 of the joining channel 28 and the abutment surfaces 38 of the second joining rim portion $E'_j$ enter into contact and thus the closing force F and the vibrations are transmitted therein, generating a localized melting.

Advantageously, with this configuration, the thermoplastic portion that is melted remains inside the joining channel 28 and does not flow out in the containment region 14 or outside the shell 10, thus allowing a joint to be made between the first shell portion 12 and the second shell portion 12' without visible burrs.

Preferably, in this step it is possible to adjust the operating parameters of the sonotrode, such as application time, amplitude and/or frequency of the vibrations, according to the type of thermoplastic material to be welded, the dimensions and/or geometry of the joining channel 28 and the joining projection 30, etc.

Subsequently, the transmission of vibrations is interrupted, and the thermoplastic material, melted and interposed between the surfaces of the joining channel 28 and the joining projection 30, is allowed to stabilize, cooling it, so as to reach a temperature adapted to keep the first shell portion 12 and the second shell portion 12' joined together.

Then, the closing force F applied to the first shell portion 12 and the second shell portion 12' is deactivated, and, finally, the shell 10 is removed from the ultrasonic welding apparatus.

Advantageously, from what has been described above, the structure of the shell 10 of the present invention and the method of construction thereof allow a material to be used, the characteristics of which, such as rigidity, may be freely chosen without restricting in the design stage the shape of the shell 10 and also ensuring, moreover, a versatile process for making thereof.

Specifically, the first shell portion 12 and the second shell portion 12' may be formed independently, and, during forming, it is not necessary to induce a bending thereof, i.e. it is not necessary to induce an elastic deformation thereof, to remove them from the forming mold. In this way, the choice of the material with which they are formed is not limited, thus allowing the use of materials having, for example, a very wide range of rigidities and preferably a thermoplastic material with high rigidity. Furthermore, the thicknesses with which the shell portions are formed are not restricted, and the degree of coverage of the user's foot is not restricted.

The first shell portion 12 and the second shell portion 12' may be fixed together by heat welding through the first joining rim portion $E_j$ and the second joining rim portion $E'_j$ that do not protrude from the shell 10, are not visible and, therefore, do not limit in the design stage the possible shapes of the shell 10.

Moreover, the shapes of the first joining rim portion $E_j$ and of the second joining rim portion $E'_j$, which provide for the joining channel 28 adapted to be engaged by the joining projection 30, ensure a durable and structurally stable attachment of the first shell portion 12 with the second shell portion 12' and, consequently, an adequate mechanical strength in use of the shell 10. Specifically, the shapes of the joining channel 28 and of the joining projection 30 allow a joining surface to be made, defined by the respective cooperating surfaces, which has a greater extension than that of the first thickness $dE_j$ and of the second thickness $dE'_j$, respectively, of the first shell portion 12 and of the second shell portion 12'. Furthermore, the height d30 of the joining projection 30 is preferably higher than the height d44 of the joining channel 28, and this ensures an increase in the mechanical seal of the weld. In other words, since the section of the joining projection 30 is preferably greater than the section of the joining channel 28 with which it engages, excess material is ensured which, when melted, allows a joining surface to be made by means of heat welding.

The joining projection 30 provides, advantageously, for the concentration head 34 which is adapted to concentrate the ultrasonic energy on a relatively small area, relative to the bottom surface 42 of the joining channel 28. In this state, the generation and propagation of heat is facilitated and, consequently, the melting of thermoplastic materials at the interface. Specifically, the shape of the vertex V is adapted to increase the effectiveness of heat generation and the degree of penetration of the joining projection 30 into the bottom surface 42 of the joining channel 28, so as to ensure the forming and mechanical seal of the hot weld.

It is clear that it is possible to make various changes to the shell 10 and the method for making thereof, without departing from the scope of protection as defined by claims 1 and 10. In effect, the construction of the shell 10 of the present invention ensures a high degree of versatility in the choice of materials and in the choice of its shape and/or characteristics in the design stage.

Below are described further embodiments of the present invention that provide for modifications in some of the elements that make up the shell 10 or in steps of the construction thereof. Therefore, elements that are substantially unchanged will not be described again, and the same numerical references will be used.

Figure 4A:
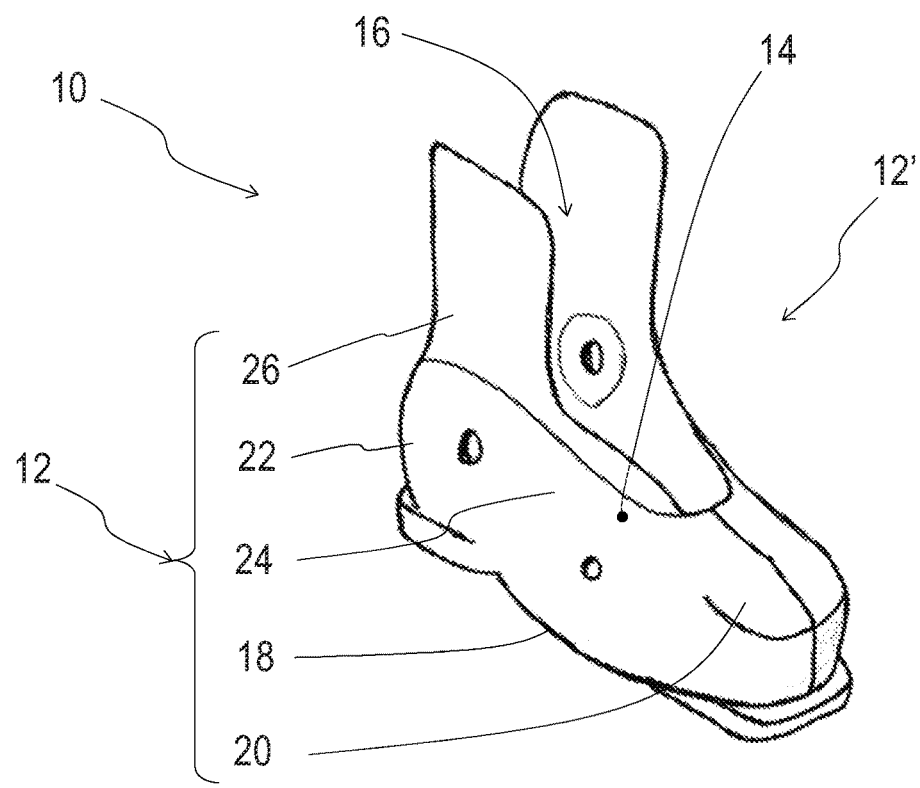
FIG. 4A is a first perspective view of a shell for a ski boot in the assembled state, in a second embodiment of the present invention.
Figure 4B:
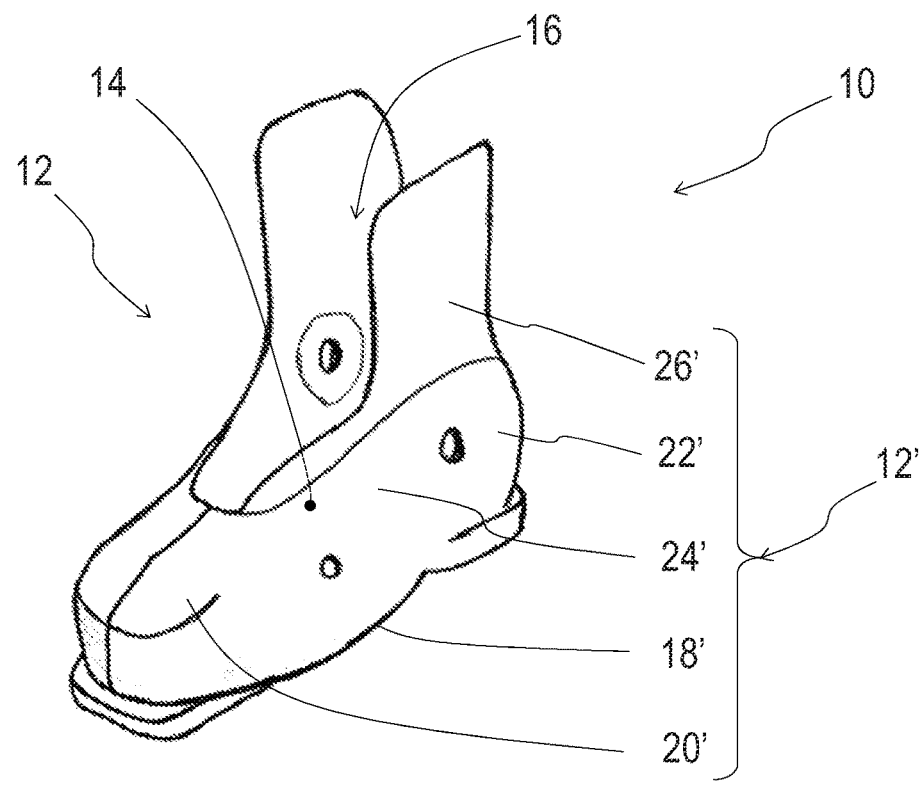
FIG. 4B is a second perspective view of the shell of FIG. 4A.

Referring to FIGS. 4A and 4B, a shell 10 of a ski boot is shown in a second embodiment wherein the first shell portion 12 and the second shell portion 12' are each formed with a plurality of different materials, for example, two materials having different rigidities.

In this embodiment, the first shell portion 12 and the second shell portion 12' provide for the same first thermoplastic material with which are formed a sole portion, respectively the first 18 and the second 18'; a toe portion, respectively the first 20 and the second 20'; a heel portion, respectively the first 22 and the second 22'; and a side portion, respectively the first 24 and the second 24'. Instead, the same second thermoplastic material is used to form the first ankle portion 26 and the second ankle portion 26', respectively, the first shell portion 12 and the second shell portion 12'. In this embodiment, the first thermoplastic material has a higher rigidity than the second thermoplastic material.

Specifically, the first shell portion 12 and the second shell portion 12' are made, each, by means of a plurality of processes and, in this embodiment, first are formed the sole portion, the toe portion, the heel portion, and the side portion, with a single forming procedure, such as injection molding with the first thermoplastic material, then the ankle portion is formed by overmolding with the second thermoplastic material.

After the first shell portion 12 and the second shell portion 12' have been formed, they are subsequently joined together by means of a heat welding process, as described above.

Advantageously, in this way, it is possible to form the first shell portion 12 and the second shell portion 12' with a plurality of different thermoplastic materials, so as to adapt the characteristics of the shell portions 10, such as rigidity, to the anatomical portion of the foot to be supported.

Figure 5A:
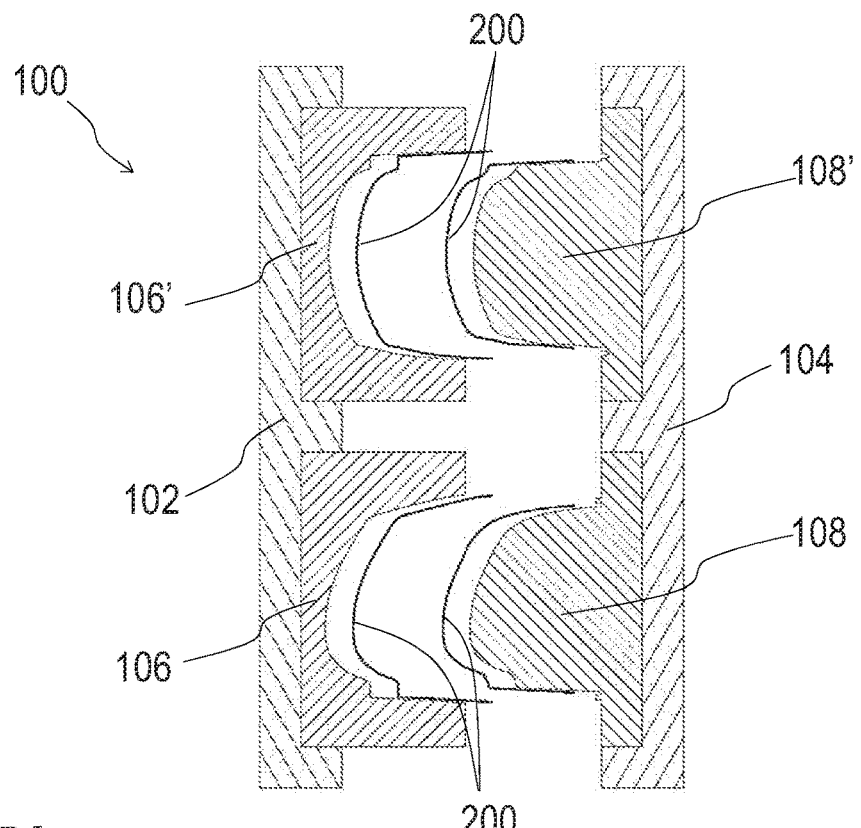
FIG. 5A is a schematic representation of a forming step of a shell for a ski boot, in a third embodiment of the present invention.
Figure 5B:
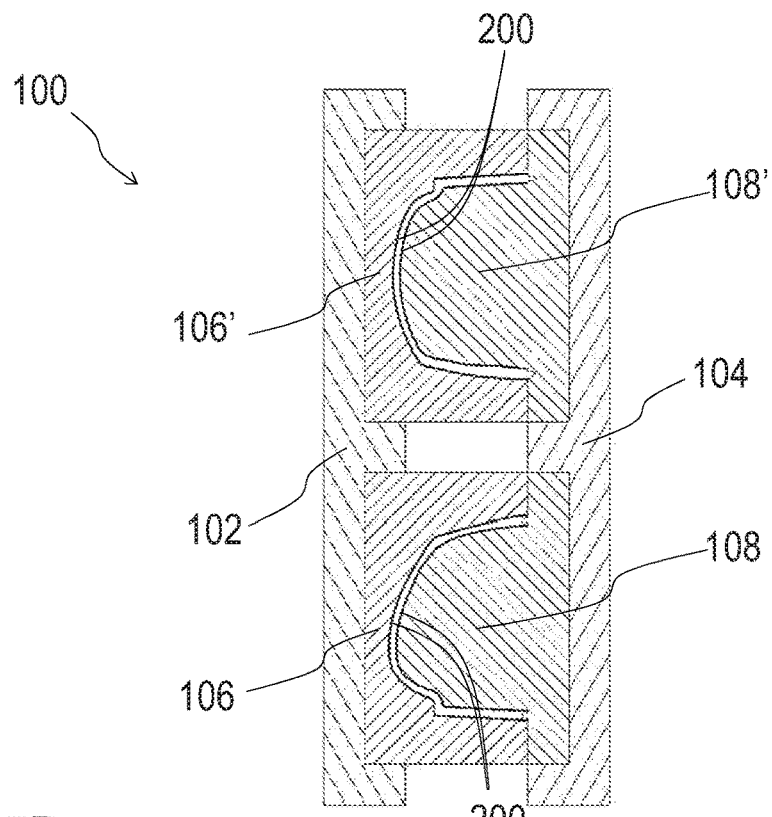
FIG. 5B is a schematic representation of a further forming step of a shell for a ski boot, in a third embodiment of the present invention.

Referring to FIGS. 5A and 5B, the steps are shown for forming portions of a shell of a ski boot in a third embodiment wherein the thermoplastic material used is, preferably, a recycled thermoplastic material; however, this choice of material is not restrictive.

It is well known that recycled thermoplastic materials, i.e. the thermoplastic materials obtained by granulating previously molded pieces or thermoplastic materials with off-specification characteristics, have mechanical properties, such as rigidity and mechanical strength, that are inferior to the same virgin material which has not undergone any processing steps. This is generally due to a degradation of the thermoplastic resin as a result of the conditions used during the processing stages, and to the fact that fillers or fibers, such as glass fiber (FV) or carbon fiber (CF), deteriorate or break due to processing conditions.

To increase the properties of the recycled thermoplastic material, it is possible to overmold the shell portions on film, suitably positioned in the forming mold, in order to give the shell improved properties. For example, the films are made of composite material comprising carbon fiber (CF) adapted to increase the mechanical properties of the recycled thermoplastic material, so as to give it the original properties of the virgin material, or further increase the properties of the virgin material.

In reference to FIGS. 5A and 5B, a mold 100 is shown used for the injection molding of a first shell portion 12 and a second shell portion 12' of a shell 10 equivalent to that of the first embodiment, and which has been described previously with reference to FIGS. 1A to 3B.

The mold 100, in this embodiment, comprises a movable portion 102 and a fixed portion 104 that are preferably closed with a movement along a horizontal direction and on which are installed the half-molds adapted to form the first shell portion 12 and the second shell portion 12'.

Specifically, on the movable portion 102 are installed the first external half-mold 106 and the second external half-mold 106', respectively, of the first shell portion 12 and of the second shell portion 12'. Instead, on the fixed portion 104 are fixed the first internal half-mold 108 and the second internal half-mold 108', respectively, of the first shell portion 12 and the second shell portion 12'.

Moreover, still referring to FIG. 5A, films 200, such as composite films comprising carbon fiber (CF), are applied to the forming surfaces of the half-molds, preferably engaging them in their entirety.

In this way, referring to FIGS. 5B, 2A and 2B, when the mold 100 is closed during the injection stage, the thermoplastic material is overmolded on the films 200, making the portions of the shell integral thereto. In other words, the first shell portion 12 and the second shell portion 12' are formed integral with the films 200 that are arranged, respectively, on the surfaces facing the containment region 14 and on the outer surfaces of the shell 10. Thus the first shell portion 12 and the second shell portion 12' are covered with the films 200.

Once the first shell portion 12 and the second shell portion 12' have been formed, they are then joined together by means of a heat welding process, as described above.

Advantageously, in this way, it is possible to form the first shell portion 12 and the second shell portion 12' provided with films 200 that may have any desired characteristic or extension. In effect, the films 200, including carbon fiber (CF), are adapted to increase the mechanical properties of the recycled thermoplastic material, due to their high rigidity, and may have any desired extension since it is not necessary to induce an elastic deformation of the first shell portion 12 and of the second shell portion 12' to remove them from the forming mold.

In this way, the choice of the material with which the films are formed is not limited, since it may have a much greater rigidity than that of the recycled thermoplastic material. Furthermore, the degree of coverage of the first shell portion 12 and the second shell portion 12' with the films 200 is not restricted.

Figure 6A:
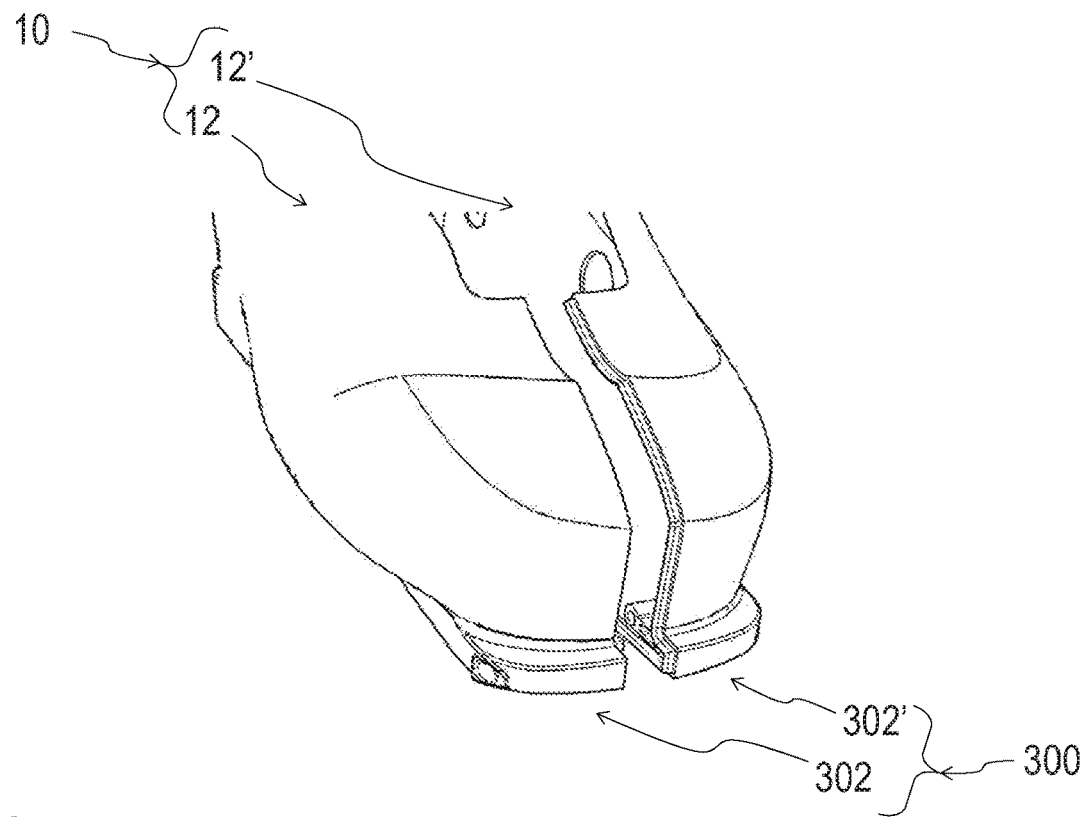
FIG. 6A is a perspective view of a portion of a shell for a ski boot in the unassembled state, in a fourth embodiment of the present invention.
Figure 6B:
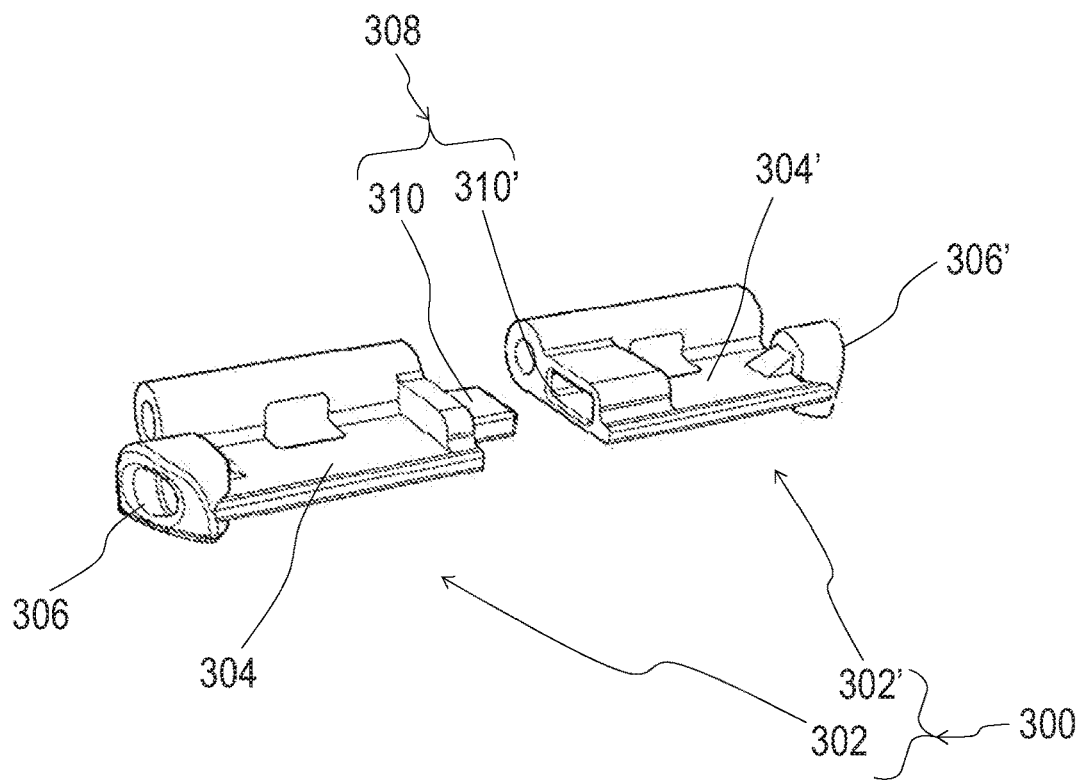
FIG. 6B is a perspective view of a functional element of the shell of FIG. 6A.

Referring to FIGS. 6A and 6B, a shell 10 of a ski boot is shown in a fourth embodiment wherein the first shell portion 12 and the second shell portion 12' each provide at the toe portion and/or at the heel portion (the latter not shown in the figure) portions of a functional element 300 which gives the shell 10 certain functions.

Specifically, in this embodiment, the functional element 300 is a device that serves as a removable element for fixing the shell 10 to the sports equipment, such as a ski binding.

In reference to FIGS. 6A and 6B, the functional element 300 comprises a first functional element portion 302 and a second functional element portion 302' formed separately.

Moreover, still referring to FIG. 6B, the first functional element portion 302 and the second functional element portion 302' comprise a substantially parallelepiped-shaped plate, respectively the first 304 and the second 304', on the bases of which are provided coupling elements, respectively the first 306 and the second 306', and fixing means 308.

Specifically, the coupling elements, the first 306 and the second 306', are elements which in use are adapted to couple the shell 10 of the boot to the sports equipment, such as the ski, through, for example, corresponding coupling portions of the sports equipment.

Moreover, the fixing means 308 are means adapted to fix the first plate 304 and the second plate 304' of the functional element 300 together. In this preferred embodiment, the fixing means 308 are a pin 310 formed on the first plate 304 and a corresponding seat 310' formed on the second plate 304', wherein the pin 310 is adapted to engage the seat 310' and to be fixed thereto by means of interference coupling so as to join together the first functional element portion 302 and the second functional element portion 302' of the functional element 300. It is clear that this embodiment is non-restrictive, and, for example, the fixing means 308 may be other types of fixing means of the first functional element portion 302 to the second functional element portion 302', such as screws or rivets.

The first functional element portion 302 and the second functional element portion 302', having the construction described above, may be formed integral with, respectively, the first shell portion 12 and the second shell portion 12', by means of a single forming process such as injection molding.

Alternatively, the first functional element portion 302 and the second functional element portion 302' may be formed independently of each other by means of a first forming step, such as an injection molding process, and subsequently the respective first shell portions 12 and second shell portions 12' are formed integral thereto by means of a second forming step, such as an overmolding process.

Alternatively, the first shell portion 12 and the second shell portion 12' may be formed, independently of each other, by means of a first forming step, such as injection molding, and subsequently the respective first functional element portion 302 and second functional element portion 302' are formed integral to these by means of a second forming stage, such as an overmolding process.

Once the first shell portion 12 and the second shell portion 12' have been formed, each provided with its respective first functional element portion 302 and second functional element portion 302' of the functional element 302, they are subsequently joined together by means of a heat welding process as described above, and furthermore the first functional element portion 302 and the second functional element portion 302' are fixed together by fixing means 308.

Advantageously, in this way, it is possible to form a shell 10 provided with a functional element 300 formed with a material that may have any characteristic and that has any desired extension. In effect, the functional element 300, acting for example as a removable device for fixing the shell 10 of the boot to the sports equipment, is generally formed with a material having high rigidity, and, therefore, with this embodiment it is not necessary to induce an elastic deformation of the first shell portion 12 and the second shell portion 12' to remove them from the forming mold. In this way, therefore, the choice of material and the extension of the functional element 300 is not restricted.

Figure 7:
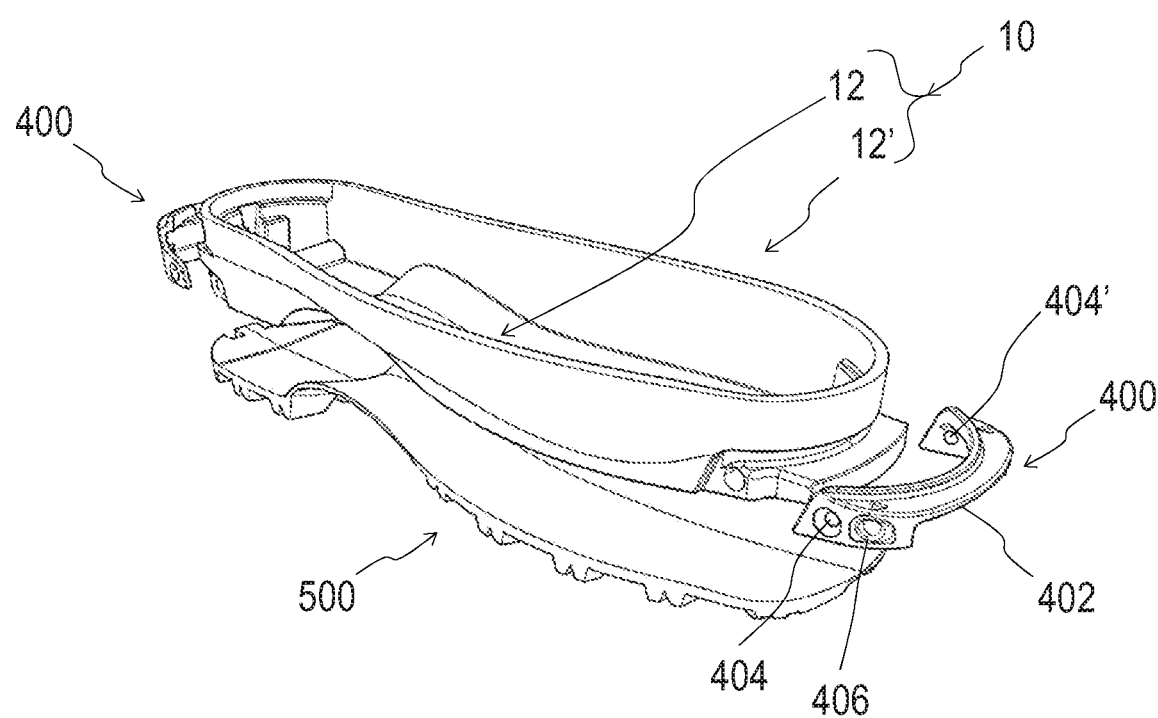
FIG. 7 is a sectioned perspective view of a shell for a ski boot in a fifth embodiment of the present invention.

Referring to FIG. 7, a perspective view of a section of a shell 10 of a ski boot is shown in a fifth embodiment wherein the first shell portion 12 and the second shell portion 12' are further fixed together by means of fixing structures 400. One should note that in FIG. 7 the first shell portion 12 and the second shell portion 12' are represented as a single piece obtained as a result of the heat welding process described above.

Specifically, the fixing structure 400, preferably metallic, holds the shell portions 10, preferably, at the respective portions of the toe and/or heel.

The fixing structure 400 comprises an arc-shaped fixing plate 402, which is shaped so as to have a shape substantially consistent with the respective toe or heel portion of the shell 10 to which it is coupled.

Moreover, the fixing structure 400 comprises, preferably at the ends thereof, fixing portions, respectively at least a first fixing portion 404 and at least a second fixing portion 404', which in use, i.e., when the fixing structure is coupled to the shell 10, are adapted to fix the fixing structure 400 to the first shell portion 12 and to the second shell portion 12', previously welded together, in order to keep these further joined.

In this embodiment, the fixing portions, the first 404 and the second 404', are holes that receive fixing means, such as screws or rivets (not shown in the figure), adapted to fix the fixing structure 400 to the first shell portion 12 and to the second shell portion 12'; however, in a further embodiment, the fixing portions, the first 404 and the second 404', are interlocking means adapted to cooperate with appropriate seats formed on the first shell portion 12 and on the second shell portion 12'.

Optionally, the fixing structure 400 comprises coupling elements, respectively the first 406 and the second 406' (only one of the two is visible in the figure), which are adapted to couple the shell 10 of the boot to the sports equipment, such as the ski, through the bindings of the sports equipment.

Moreover, it is possible to provide additional fixing structures 500 that are coupled to the shell 10 at other portions thereof, such as, for example, the sole portion, and that are able to be fixed, by additional fixing means, to the first shell portion 12 and to the second shell portion 12' in order to keep these further joined together.

Advantageously, in this way, it is possible to form a shell 10, comprising the first shell portion 12 and the second shell portion 12' heat welded as described above, the structural stability of which is further ensured by the fixing structures.

In the description provided thus far, heat welding is carried out by ultrasonic welding, however, heat welding may optionally be carried out by other processes, such as hot gas welding.

Welding distinct parts together by hot gas welding is generally done by heating the surfaces of the pieces to be welded by means of a device that forms and directs a flow of hot gas, generally air or nitrogen, until the welding temperature is reached. Subsequently, the surfaces of the pieces to be welded are positioned in a juxtaposed stacked relationship to form a contact region, i.e., an "interface". Subsequently, a closing force is exerted between the pieces, i.e., between the surfaces at the interface, and the melted materials are left to solidify, i.e., to cool, so as to form a joining portion, i.e., a weld portion.

As in the method described above, first, the first shell portion 12 and the second shell portion 12' of the shell 10 are formed with known techniques such as, for example, injection molding.

Then the first shell portion 12 and the second shell portion 12' are placed inside a hot gas welding apparatus so that the joining channel 28 of the first joining rim portion $E_j$ and the corresponding joining projection 30 of the second joining rim portion $E'_j$ are heated by a heating device until the welding temperature is reached. In this embodiment the heating device is adapted to generate and direct a flow of hot gas on the joining channel 28 and on the corresponding joining projection 30.

Subsequently, the first shell portion 12 and the second shell portion 12' are arranged so that the joining channel 28 of the first joining rim portion $E_j$ is engaged by the respective joining projection 30 of the second joining rim portion $E'_j$, putting them in contact.

Then a closing force is applied, by means of a press system, on the first shell portion 12 and/or on the second shell portion 12' in order to mutually press them against each other, applying a preferably adjustable pressure, the first joining rim portion $E_j$ towards the second joining rim portion $E'_j$ at the contact region, i.e., at the interface.

Specifically, during the application of the closing force, the partially melted concentration head 34 penetrates the partially melted bottom surface 42 due to the closing force applied. Moreover, the same closing force applied allows advantageously to distribute, i.e., to push, the melted portion of the material along the side surfaces 44 of the joining channel 28 and along the side surfaces 36 of the body 32 of the joining projection 30, filling a gap g therebetween.

Subsequently, the thermoplastic material melted and interposed between the surfaces of the joining channel 28 and the joining projection 30 is allowed to stabilize, cooling it, so as to reach a temperature adapted to keep the first shell portion 12 and the second shell portion 12' joined together.

Finally, the closing force F applied to the first shell portion 12 and the second shell portion 12' is deactivated and the shell 10 is removed from the hot gas welding apparatus.

It is clear that further changes to the shell 10 and to the method for making thereof are possible with respect to what has been described so far.

For example, in the previous description the joining channel 28 and the joining projection 30 extend continuously along, respectively, the entire extension of the first joining rim portion $E_j$ of the first shell portion 12, and along the entire extension of the second joining rim portion $E'_j$ of the second shell portion 12'.

This shape is particularly advantageous, since it ensures watertightness in use; however, it is possible to provide for a shell 10 wherein on the first joining rim portion $E_j$ is formed a plurality of distinct joining channels 28 that is adapted to cooperate with a corresponding plurality of distinct joining projections 30 formed on the second joining rim portion $E'_j$.

Alternatively, it is possible to provide for a shell 10, wherein on the first joining rim portion $E_j$ is formed a plurality of joining channels 28 and joining projections 30, which is adapted to cooperate with a corresponding plurality of joining projections 30 and joining channels 28 formed on the second joining rim portion $E'_j$.

Moreover, it is possible to provide for a plurality of joining channels 28 and corresponding joining projections 30 formed along the direction of the thickness, respectively, of the first joining rim portion $E_j$ and the second joining rim portion $E'_j$. Optionally, the joining channel 28 and the body 32 of the joining projection 30 may have any shape adapted to form a shape coupling.

Furthermore, in the preceding description, the joining projection 30 provides for a concentration head 34 having a substantially triangular section. However, the concentration head 34 may have any suitable section, e.g. hemispherical, and possibly may have a smaller extension than the base of the body 32 on which it is formed. Alternatively, the concentration head 34 may have a section wherein more than one vertex V is provided.

Moreover, in the third embodiment described above, the films 200 are made of a composite material reinforced with carbon fibers (CF), the function of which is to increase the rigidity of the thermoplastic material with which the shell 10 is formed. However, it is possible to provide for a shell 10 wherein the films 200 comprise one or more films of material suitable to modify other properties. For example, the films 200 may be suitable to modify an aesthetic aspect or surface finish of the shell 10 by means of decorative films that modify the surface appearance of a recycled material from which the shell 10 is formed. Alternatively, the films 200 are adapted to modify the surface wear or scratch resistance properties of the shell 10 by means of films comprising, for example, Teflon (PTFE) and the like.

In addition, in the preceding description, the shell 10 comprises a first shell portion 12 and a second shell portion 12'. However, it is possible to provide for a shell 10 comprising more than two portions of the shell, which are first formed separately and then joined together by heat welding, as described above.

Furthermore, in the preceding description, the ultrasonic welding process described provides for the use of a single sonotrode; however, it is possible to provide for a plurality of sonotrodes, properly arranged, to act simultaneously or sequentially by ultrasonic welding the first shell portion 12 and a second shell portion 12' through corresponding parts of the respective first joining rim portion $E_j$ and second joining rim portion $E'_j$.

Moreover, it is possible to provide for a shell 10 wherein two or more of the embodiments described above are combined. For example, it is possible to provide for a shell 10 wherein the first shell portion 12 and the second shell portion 12' are each formed with a plurality of different materials, are coated with composite film, and are fixed together by means of heat welding and a fixing structure.

From what has been described thus far, it is clear that significant results have been achieved, overcoming the drawbacks of the state of the art, making it possible to construct a sports shoe comprising a shell 10 and a versatile molding process that may allow the use of materials the characteristics of which, such as, for example, rigidity, may be variously selected, without restricting the shape of the shell 10 during the design stage.

In effect, the shell 10 may be made with any desired material, having a wide range of characteristics, such as rigidity. Optionally, the characteristics of the materials used to form the shell 10 may be modified by coupling films 200, the characteristics or degree of extension of which are not restricted at the design stage by the forming technique of the shell 10.

In addition, the construction of the shell 10 ensures a wide range of solutions at the design stage with regard to the shape and thickness of the elements that compose it. For example, when forming the first shell portion 12 to the second shell portion 12' using a mold, such as that shown in FIGS. 5A and 5B, it is possible to shape the respective half-molds according to the requirements for which the boot is designed.

Furthermore, the construction of the shell 10 allows a durable and structurally stable fixing of the first shell portion 12 to the second shell portion 12' ensuring, in use, an adequate mechanical strength of the shell 10.

Finally, the joining channel 28 and the joining projection 30, which serve as joining portions, do not protrude from the shell 10 and are not visible, thus ensuring a high degree of versatility in the design stage and a high aesthetic quality of the product.

Naturally, the materials and equipment used for the implementation of the present invention, as well as the shape and sizes of the individual components, may be those most suitable according to the specific requirements.

The invention claimed is:

1. A sports shoe comprising:
a shell formed by at least a first shell portion and at least a second shell portion distinct from each other and adapted for being assembled together, the first shell portion including a first peripheral rim edge, the second shell portion including a second peripheral rim edge, and the first peripheral rim edge and the second peripheral rim edge include, respectively, a first joining rim portion and a second joining rim portion adapted to be coupled to each other to fix the first shell portion with the second shell portion, wherein:
the first joining rim portion includes at least a joining channel including a bottom surface and a plurality of side surfaces, the joining channel being adapted to cooperate with a corresponding at least a joining projection including a concentration head and a body, the joining projection being included in the second joining rim portion,
the bottom surface is adapted to cooperate with the concentration head and the plurality of side surfaces are adapted to cooperate with the body,
the body has a section having two surfaces that are complementary in shape to two of the side surfaces of the joining channel,
the joining channel and the corresponding joining projection are fixable to each other by heat welding the concentration head of the joining projection includes a vertex adapted to cooperate with the bottom surface of the joining channel, the vertex being spaced from the two surfaces of the section of the body, and
the vertex has an internal angle in a range of 45 to 120 degrees.

2. The sports shoe according to claim 1, wherein the joining projection has a height which is greater than a height of the joining channel.

3. The sports shoe according to claim 2, wherein the height of the joining projection is 0.57 to 0.96 times a thickness of the first joining rim portion and a thickness of the second joining rim portion, and the height of the joining channel is 0.38 to 0.64 times a thickness of the first joining rim portion and of a thickness of the second joining rim portion.

4. The sports shoe according to claim 1, wherein the first shell portion and the second shell portion each include a plurality of portions formed with different thermoplastic materials.

5. The sports shoe according to claim 1, wherein the first shell portion or the second shell portion is provided with at least a film integral with at least a surface portion of the first shell portion or a surface portion of the second shell portion.

6. The sports shoe according to claim 1, wherein: the a first shell portion includes at least a first functional element portion and the second shell portion includes at least a second functional element portion, and the first functional element portion and the second functional element portion are fixable to each other by fixing means to form a functional element of the shell when the first shell portion and the second shell portion are fixed to each other.

7. The sports shoe according to claim 1, wherein: when the first shell portion and the second shell portion are fixed to each other, the first shell portion and the second shell portion are further fixed to each other by at least a fixing structure, and the fixing structure is simultaneously fixed to the first shell portion and to the second shell portion by respective fixing portions.

8. A method for making the sports shoe according to claim 1 comprising the steps of:

a. heating a material of the joining channel and of the corresponding the joining projection of the respective first joining rim portion and the second joining rim portion to reach a welding temperature,
    b. applying a closing force to mutually press the joining channel on the joining projection, and
    c. cooling the material of the joining channel and of the joining projection to reach a condition adapted to keep the shell portions joined together.

9. The method for making the sports shoe according to claim 8, wherein the material heating step is carried out by applying ultrasonic energy through vibrations to generate a heating of the material of the joining channel and the joining projection by means of friction, the ultrasonic energy being deactivated before the step c).

10. The method for making the sports shoe according to claim 8, wherein the material heating step is carried out by heat transfer at the joining channel and the joining projection by means of a heating device.

11. The method for making the sports shoe according to claim 9, wherein, step b) further includes a step of penetrating the bottom surface of the joining channel by means of the concentration head of the joining projection.

12. The method for making the sports shoe according to claim 11, wherein, upon reaching the welding temperature, a melted material of the joining projection and of the joining channel is distributed and contained within the joining channel.

* * * * *